Dec. 10, 1957  E. M. ERICSON  2,815,533
ENCAPSULATING MACHINE-SPREADER BOX AND GELATIN LEVEL CONTROL
Filed April 8, 1954  2 Sheets-Sheet 2

INVENTOR.
ELOF M. ERICSON
BY
Harold W. Eaton
ATTORNEY

United States Patent Office 2,815,533
Patented Dec. 10, 1957

2,815,533

ENCAPSULATING MACHINE-SPREADER BOX AND GELATIN LEVEL CONTROL

Elof M. Ericson, Worcester, Mass., assignor to Norton Company, Worcester, Mass., a corporation of Massachusetts Application April 8, 1954, Serial No. 421,917

1 Claim. (Cl. 18—15)

The invention relates to encapsulating machines and more particularly to a gelatin spreader box and level control therefor.

One object of the invention is to provide a simple and thoroughly practical gelatin flow control to facilitate forming a gelatin ribbon of a predetermined uniform thickness. Another object is to provide a gelatin spreader box and level control therefor. Another object is to provide means automatically to maintain a constant gelatin level within the spreader box so as to provide a uniform constant head of gelatin therein. Another object is to provide a float actuated device for automatically controlling the flow of gelatin from the machine tank so as to maintain a constant level of gelatin within the spreader box to facilitate forming a gelatin ribbon of a predetermined thickness. Other objects will be in part obvious or in part pointed out hereinafter.

In the accompanying drawings in which is shown one of various possible embodiments of the mechanical features of the invention, Fig. 1 is a fragmentary front elevation of an encapsulating machine having the casing broken away to show the casting cylinders, spreader boxes and gelatin tanks;

Figure 1:
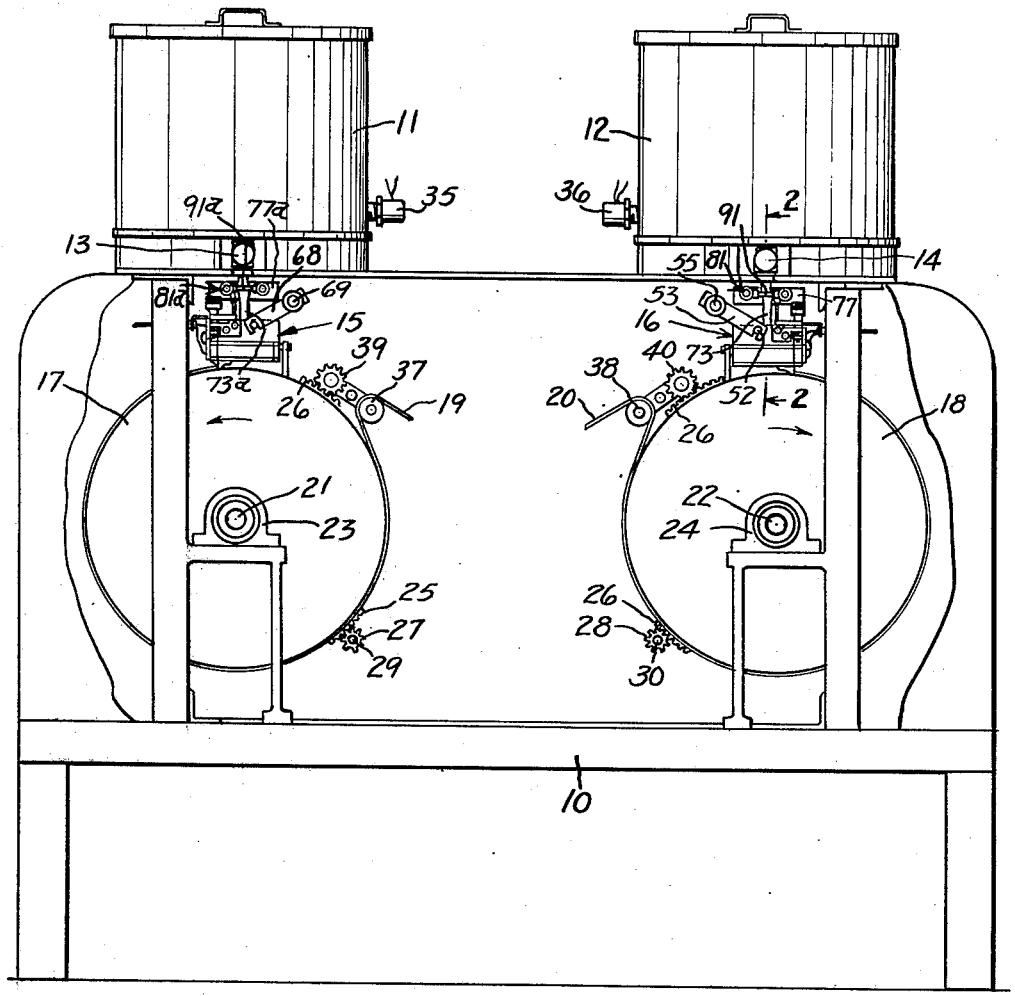

A portion of an encapsulating machine has been illustrated in the drawings comprising a base 10 which supports a pair of gelatin tanks 11 and 12 on the upper surface thereof. Liquid gelatin is delivered from the gelatin tanks 11 and 12 through manually operable control valves 13 and 14 into a pair of spreader boxes 15 and 16 respectively. The spreader boxes in turn feed the liquid gelatin onto the peripheries of a pair of casting drums 17 and 18 to form a pair of flat ribbons of gelatin 19 and 20 respectively. The drums 17 and 18 are fixedly supported on rotatable shafts 21 and 22 which are journalled in suitable bearings 23 and 24 respectively. The drums 17 and 18 are each provided with a gear 25 and a gear 26 respectively. The gears may be either formed integral with the drum or fixedly mounted on the end face thereof.

Drums 17 and 18 are driven by a pair of pinions 27 and 28 respectively which are supported on driven shafts 29 and 30. The shafts 29 and 30 together with the gears 27 and 28 are driven in opposite directions so as to transmit a rotary motion to the drums 17 and 18 so that they rotate in opposite directions as indicated by the arrows in Fig. 1.

Electric heating units 35 and 36 are provided for maintaining gelatin within the tanks 11 and 12 respectively at the desired uniform temperature so that the consistency of the gelatin contained therein is maintained constant so that it will flow freely through the control valves 13 and 14 into the spreader boxes 15 and 16 respectively which form wide flat ribbons on the peripheries of the casting drums 17 and 18 respectively. The drums 17 and 18 are kept cool in a suitable manner such as by means of a refrigerating system which may be the same as that shown in the U. S. Patent No. 2,643,416 to R. E. Moule, dated June 30, 1953, to which reference may be had for details of disclosure not contained herein. The fluid gelatin passing from the spreader boxes 15 and 16 onto the refrigerated drums 17 and 18 congeals to form a relatively wide flat ribbon of gelatin. This ribbon passes around the drums and is fed away from the periphery of the drums by positively driven rollers 37 and 38. The rollers 37 and 38 are positively driven by small gears or pinions 39 and 40 respectively which mesh with the gears 25 and 26 respectively.

The ribbons of gelatin 19 and 20 after leaving the drums 17 and 18 are passed to an encapsulating mechanism (not shown) which may be, for example, substantially the same as that shown in the U. S. Patent No. 2,549,327 to R. E. Moule, dated April 17, 1951, to which reference may be had for details of disclosure not contained herein.

Figure 3:
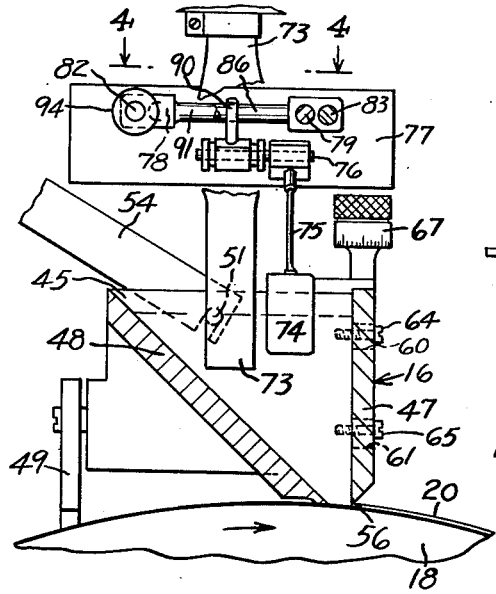
Fig. 3 is a fragmentary sectional view, on an enlarged scale, taken approximately on the line 3—3 of Fig. 2 through the spreader box.
Figure 2:
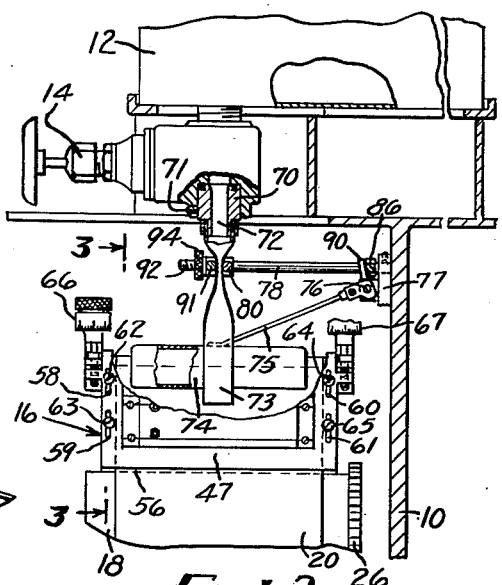
Fig. 2 is a fragmentary vertical sectional view, on an enlarged scale, taken approximately on the line 2—2 of Fig. 1, through a portion of the machine showing the spreader box and level control.
Figure 4:
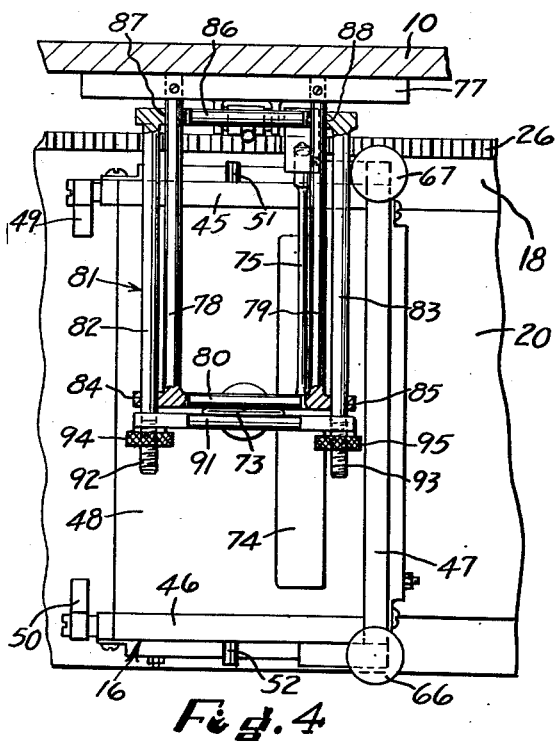
Fig. 4 is a fragmentary sectional view, on an enlarged scale, taken approximately on the line 4—4 of Fig. 3, showing the gelatin level control mechanism.

The spreader boxes 15 and 16 are identical in construction, consequently only the spreader box 16 will be shown and described in detail. The spreader box 16 as shown in Figs. 2, 3 and 4 comprises a pair of spaced end walls 45 and 46, an adjustable side wall in the form of an adjustable doctor-blade 47 and a combined rear and bottom plate 45 to form a relatively small bottom aperture on the spreader box. The spreader box 16 is provided with a pair of legs 49 and 50 which are fastened to the side walls 45 and 46 respectively. The lower ends of the rear and bottom plates 48 together with the legs 49 and 50 are shaped to mate with and rest upon the cylindrical surface of the casting drum 18.

In order that the spreader box 16 may be held in a relatively stationary position on the casting drum 18, the side plates 45 and 46 are provided with a pair of oppositely projecting studs 51 and 52 respectively which are engaged by a pair of pivotal arms 53 and 54 which are supported by a shaft 55 fixedly mounted relative to the base 10 of the machine. When the casting drum 18 is rotated in the direction of the arrow as shown in Fig. 1, the arms 53 and 54 engage the studs 51 and 52 respectively and hold the spreader box stationary and in contact with the periphery of the casting drum 18.

The doctor-blade 47 is arranged so that it may be adjusted vertically to facilitate varying the space 56 between the lower edge of the plate 47 and the periphery of the drum 18. The doctor-blade 47 is provided with a plurality of elongated slots 58, 59, 60 and 61. Clamping screws 62, 63, 64 and 65 pass through elongated slots 58, 59, 60 and 61 respectively and are screw threaded into the side plates 45 and 46 of the spreader box 16. A pair of vertically arranged adjusting screws 66 and 67 are provided to facilitate vertically adjusting the doctor-blade 47 as desired after which it may be clamped in adjusted position to facilitate regulating the thickness of the fluid gelatin flowing onto the casting drum 18 so as to control the thickness of the gelatin ribbon being produced.

Similarly the spreader box 15 is anchored by a pair of spaced arms 68 which are supported by a rock shaft 69.

In order to form capsules which are automatically filled with the desired material and to have the two opposing gelatin films properly sealed, it is essential that the gelatin ribbons be of a predetermined and uniform thickness throughout. In order to provide a uniform thickness of the gelatin ribbons being produced, it is essential that the head of gelatin contained in the spreader boxes 15 and 16 be maintained constant during the entire operation of the machine. This is preferably accomplished by means of a float actuated mechanism which will be hereinafter described.

Fluid gelatin from the tanks 11 and 12 flows through the manually operable valves 13 and 14 respectively into spreader boxes 15 and 16 respectively. Each of the valves 13 and 14 is provided with a sleeve 70 which is held in position by means of a foot screw 71. The sleeve 70 is provided with a central aperture 72 through which fluid gelatin may flow into a plastic tube 73 which is clamped to the lower end of the sleeve 70. It will be readily apparent from the foregoing disclosure that the sleeve together with the tube 73 may be readily detached from the machine to facilitate cleaning the same when changing the type or color of gelatin being employed.

In order to control the head or level of gelatin within the spreader boxes 15 and 16, a float actuated mechanism is provided for varying the aperture within the tube 73. This mechanism comprises a float 74 fixedly mounted on an arm 75 which is pivotally supported by a stud 76 carried by a bracket 77 fixedly mounted relative to the base 10. The bracket 77 supports a pair of horizontally arranged rods 78 and 79 which are connected at their outer ends by a cross rod 80 which engages the side face of the plastic tube 73. The rods 78 and 79 serve as a support for a slidably mounted member 81 which comprises a pair of spaced slide rods 82 and 83, the outer ends of which are slidably supported in apertures 84 and 85 respectively formed in the cross rod 80. The inner ends of the rods 82 and 83 are connected by a cross rod 86 which is provided with a pair of spaced holes or apertures 87 and 88 which form a slidable support for the slide member 81 on the rods 82 and 83 respectively.

The arm 75 is fixedly connected with an upwardly projecting stud 90 which is arranged to engage the cross rod 86 when the float is raised and its supporting arm 75 is rocked in a clockwise direction. Movement of the stud 90 in a clockwise direction (Fig. 2) serves to cause an adjustably mounted cross rod 91 carried by the outer ends of the rods 82 and 83 toward the cross rod 80 to impinge or squeeze upon the opposite side face of the plastic tube 73 thereby varying a central aperture of the tube 73 to check the flow of gelatin therethrough. The rods 82 and 83 are provided with screw threads 92 and 93 together with knurled adjusting nuts 94 and 95 respectively by means of which the position of the cross rod 91 may be adjusted relative to the supporting rods 82 and 83. It will be readily apparent from the foregoing disclosure that the float 74 serves to control the aperture of the tube 73 so as to maintain a constant level on the head of gelatin within the spreader box 16.

The spreader box 15 is similarly provided with an identical float actuated control, the parts of which have been designated with the same reference numerals with the suffix "a."

The operation of this spreader box and gelatin level control will be readily apparent from the foregoing disclosure. The tanks 11 and 12 are kept supplied with fluid gelatin which is maintained at the desired and predetermined consistency by means of the heating units 35 and 36, the valves 13 and 14 are opened to allow gelatin to flow from the tanks 11 and 12 into the spreader boxes 16 and 17. The knurled adjusting screws 66 and 67 are adjusted to position the doctor-blade 47 to adjust the aperture 56 so that a ribbon of gelatin will be formed on the drums 17 and 18 of the desired thickness. The knurled nuts 94 and 95 are adjusted so that during the operation of the machine there is a continuous flow of gelatin through the tube 73, the float-actuated mechanism serving to control the tube aperture so as to maintain a constant head or level of gelatin within the spreader boxes 16 and 17 which serves together with the aperture 56 under the doctor-blade 47 to form a continuous ribbon of gelatin on the casting drums of the desired uniform thickness.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

In apparatus for casting ribbons of gelatin and the like, the combination with a receptacle to contain the material to be cast, a spreader box having an adjustable orifice to deliver said material, a rotatable casting drum to receive said material, a flexible tube to convey material from said receptacle to said spreader box, and a float-actuated mechanism to control the aperture of said tube including a pair of spaced members engaging diametrically opposite sides of said tube, a pair of fixedly mounted spaced parallel rods formed integral with one of said members, a second pair of spaced parallel slide rods to support the other of said members, said latter rods being slidably supported by the first rods, and operative connections between the float and said second rods to cause said members to move relatively toward and from each other so as to squeeze said tube to vary the effective aperture thereof to facilitate maintaining a uniform head of material in said spreader box.

References Cited in the file of this patent

UNITED STATES PATENTS

| | | |
|---|---|---|
| 1,744,884 | Greiner | Jan. 28, 1930 |
| 2,129,240 | Sanborn | Sept. 6, 1938 |
| 2,427,714 | Cooper | Sept. 23, 1947 |